US006597832B2

United States Patent
Cheng

(10) Patent No.: US 6,597,832 B2
(45) Date of Patent: Jul. 22, 2003

(54) OPTICAL FIBER SELECTOR

(76) Inventor: Yu-Feng Cheng, No. 7, Fuhsing St., Tucheng Ind. Dist., Tucheng City, Taipei Hsien (TW)

(*) Notice: Subject to any disclaimer, the term of this patent is extended or adjusted under 35 U.S.C. 154(b) by 60 days.

(21) Appl. No.: 10/005,167

(22) Filed: Dec. 7, 2001

(65) Prior Publication Data
US 2003/0108279 A1 Jun. 12, 2003

(51) Int. Cl.[7] .................................................. G02B 6/26
(52) U.S. Cl. .............................. 385/25; 385/56; 385/58
(58) Field of Search ............................. 385/15, 16, 19, 385/20, 25, 53, 55, 56, 58, 59, 70, 71, 72

(56) References Cited

FOREIGN PATENT DOCUMENTS

JP          411344681 A  * 12/1999  ........... G02B/26/08

* cited by examiner

Primary Examiner—David V. Bruce
Assistant Examiner—Therese Barber
(74) Attorney, Agent, or Firm—Rabin & Berdo, P.C.

(57) ABSTRACT

An optical fiber selector includes a housing, a rod pivotally mounted inside the housing, a switch controlling the pivotal movement of the rod, a sliding plate connected to a free end of the rod. An in/out port is mounted on a front side of the housing to be connected with a main optical fiber, and multiple connecting ports are also mounted on the front side and adjacent to the in/out port to be respectively connected to multiple branch optical fibers. The sliding plate has a connecting head connected to the in/out port via an internal optical fiber, and the connecting head is able to be selectively connected with one of the connecting ports. Therefore, the user is able to select which branch optical fiber is to be connected with the main optical fiber.

5 Claims, 7 Drawing Sheets

OPTICAL FIBER SELECTOR

BACKGROUND OF THE INVENTION

1. Field of the Invention

The present invention relates to an optical fiber selector, and more particularly to an optical fiber selector that is compact and can be operated by a single hand.

2. Description of Related Art

With the rapid growth of electronic technology, a medium used today for transmitting signals in electronic devices needs to have a significant capacity of transmitting a large quantity of signals. An optical fiber is invented and used in order to satisfy this demand of the high performance medium. The optical fiber can transmit signals in a level of efficiency that a traditional medium such as a copper wire can never reach. Therefore, the optical fiber is becoming an important medium for transmitting signals in the electronic and the photoelectric technologies.

FIG. 6 shows a conventional optical fiber selector used to selectively connect a main optical fiber (not shown) to several branch optical fibers (not shown).The optical selector includes a housing (60) and a switch (70) rotatably received in the housing (60). An in/out port (61) and multiple connecting ports (62, 63 and 64) are mounted in the housing (60), wherein the in/out port (61) is to be connected to the main optical fiber and the connecting ports (62, 63 and 64) are to be respectively connected to the branch optical fibers. It should be appreciated that the number of connecting ports (62, 63, and 64) can vary in order to meet practical needs and three connecting ports are shown and described for exemplary illustration. A boss (71) is formed on a top surface of the switch (70), and has a button (72) moveably protruding from an end of the boss (71).

Further referring to FIG. 7, a sliding block (73) mounted on a circular side of the switch (70) is located in the housing (60) and slidable on a rail (65) formed in the housing (60). Two abutting pieces (66) are respectively formed at distal ends of the rail (65) so as to prevent the sliding block (73) from derailing. A connector (74) is moveably mounted inside the sliding block (73) and provided with a spring (75) to urge a head (742) of the connector (74) to protrude out of the sliding block (73) to be connected with one of the connecting ports (62, 63 and 64). The movement of the connector (74) is controlled by the pushbutton (72). An internal optical fiber (80) is further provided to link the in/out port (61) to the connector (74), or in other words to link the main optical fiber to one of the branch optical fibers. More specifically, a user is able to push the button (72) to withdraw the connector (74) inside the sliding block (73), and rotate the switch (70) to align the connector (74) to a desired one of the connecting ports (62, 63 and 64). Therefore, the user can select one of the branch optical fibers to be connected to the main optical fiber.

However, the conventional optical fiber selector has the following two main disadvantages:

1. Large Size

Any optical fiber by nature can not be bent to have a sharp corner. Otherwise, signals transmitted via the optical fiber will experience a significant loss. Therefore, an interior of the housing (60) must be large enough to allow the internal optical fiber (80) to turn gradually. Accordingly, the conventional optical fiber selector is large in size.

2. Inconvenience

The mentioned optical fiber selector has to be operated using both hands of the user, and more specifically a hand of the user has to hold the housing (60) and the other hand has to operate the switch (70). This operation which requires both hands is considered to be inconvenient.

To overcome the shortcomings, the present invention tends to provide an improved optical fiber selector to mitigate or obviate the aforementioned problems.

SUMMARY OF THE INVENTION

The objective of the present invention is to provide an optical fiber selector that can be used to selectively connect a main optical fiber to one of multiple branch optical fibers.

Another objective of the present invention is to provide an optical fiber selector that is compact and can be conveniently operated by a single hand.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
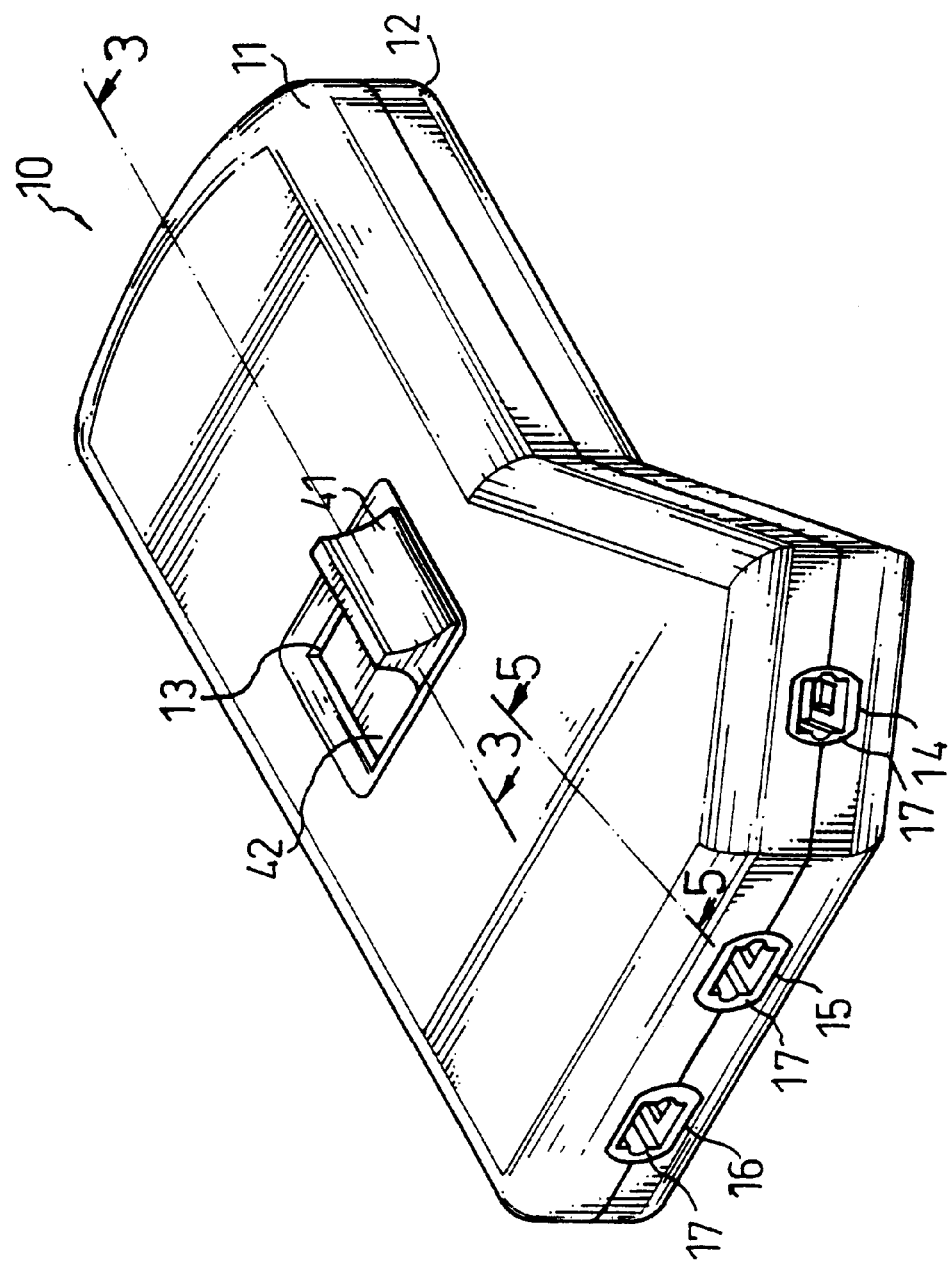
FIG. 1 is a perspective view of an optical fiber selector in accordance with the present invention.
Figure 2:
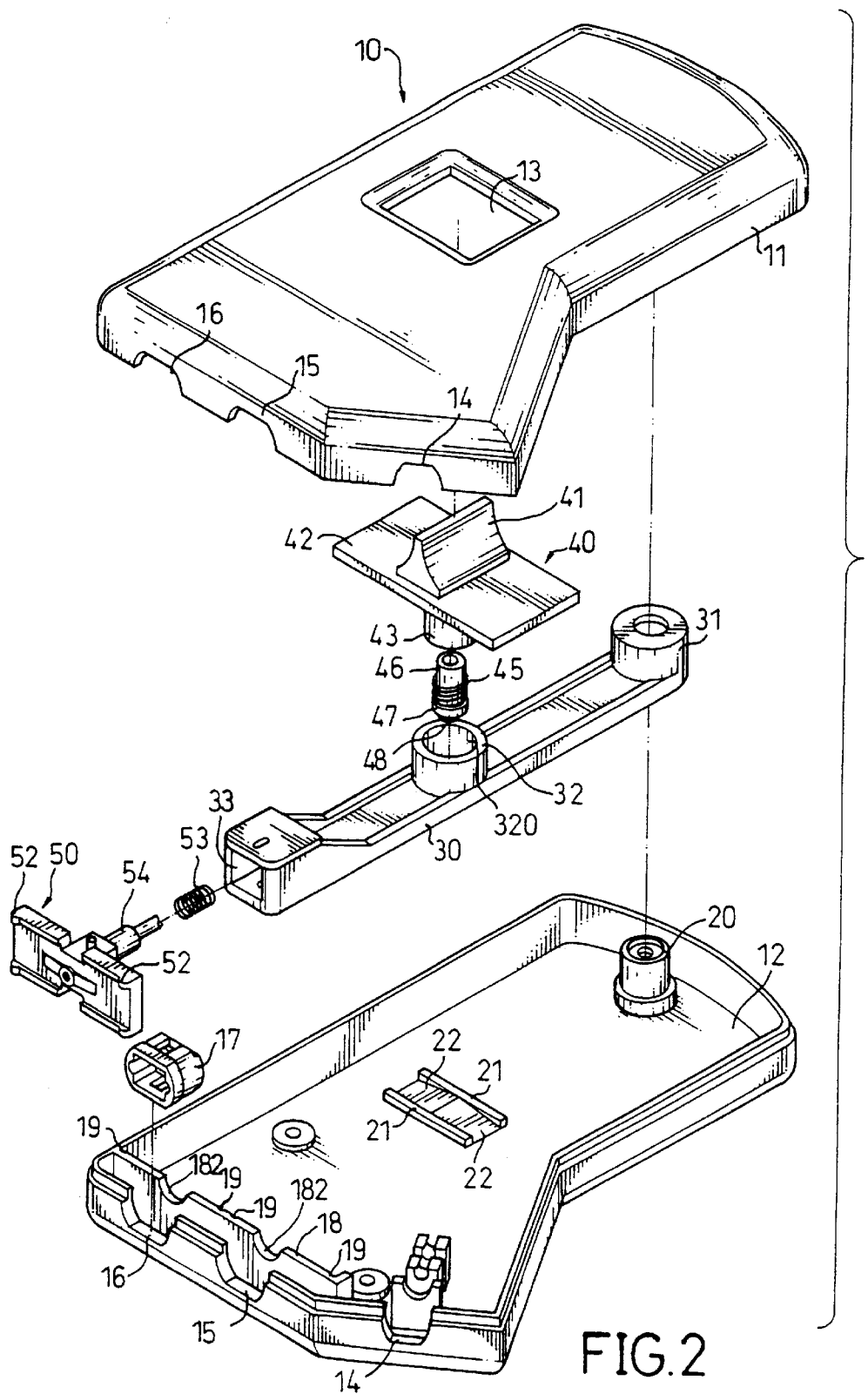
FIG. 2 is an exploded, perspective view of the optical fiber selector.

With reference to FIGS. 1 and 2, an optical fiber selector in accordance with the present invention includes a housing (10), a rod (30) pivotally mounted inside the housing (10), a switch (40) controlling the pivotal movement of the rod (30), and a sliding plate (50) connected to a free end of the rod (30).

The housing (10) is composed of a cover (11) and a base (12) securely fitted together. A slot (13) is defined in the cover (11). An in/out port (14) is located on a front side of the housing (10), and two connecting ports (15, 16) are also located on the front side and next to the in/out port (14). Each of the in/out port (14) and the connecting ports (15, 16) securely receives a plug (17) for connecting with a main optical fiber (not shown) or a branch optical fiber (not shown). Two ridges (21) are formed on an inner surface of the base (12) and parallel with each other. A hill (22) is formed between the ridges (21) and has an apex at the middle. A peg (20) is formed on the inner surface and in a rear portion of the base (12). A wall (18) is formed on the inner surface and in a front portion of the base (12), wherein the wall (18) is parallel with the front side of the housing (10). Two cutouts (182) are defined in the wall (18) and respectively align to the connecting ports (15, 16). Multiple dimples (19) are defined in the wall (18) and on opposite sides of the cutouts (182).

The rod (30) has the free end and a hinge end (31). The hinge end (31) is pivotally connected to the peg (20) of the base (12). A hollow cylinder (32) is formed on a middle section of the rod (30). A bore (320) is defined in the hollow cylinder (32) and through the rod (30). A socket (33) is defined in the free end of the rod (30).

Figure 3:
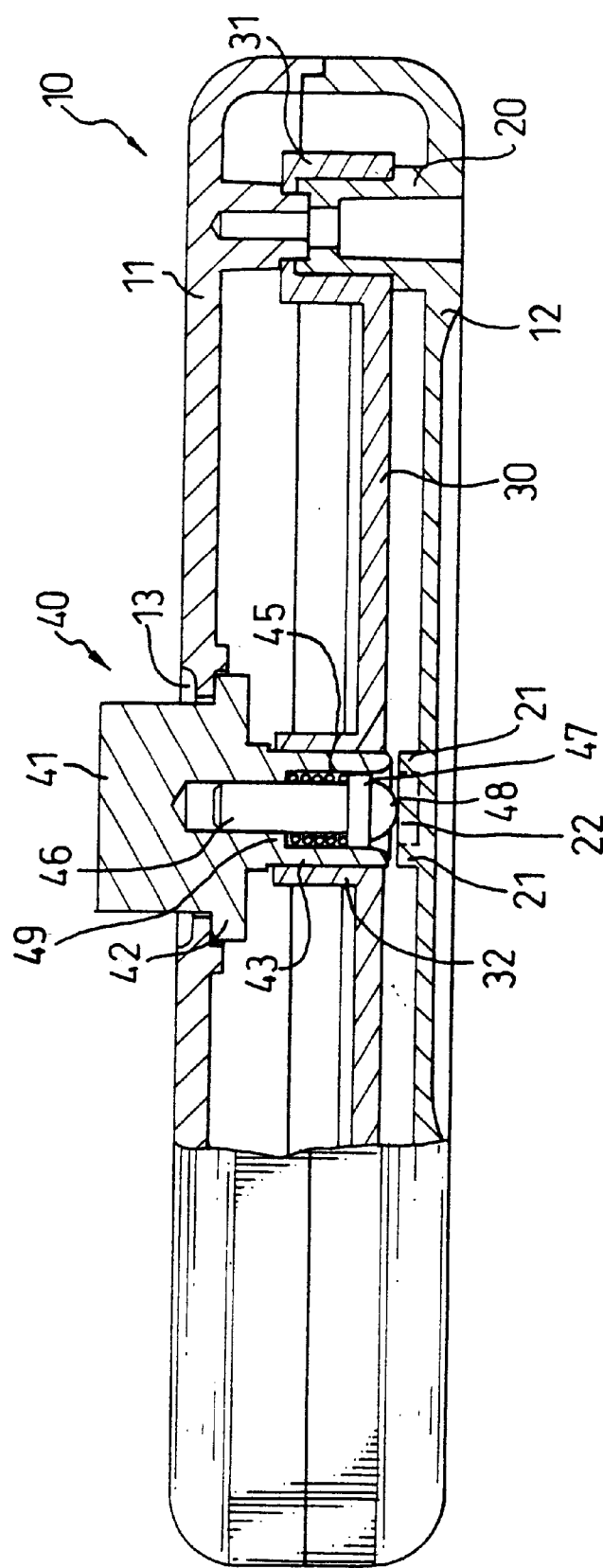
FIG. 3 is a partially cross-sectional, side view of the optical fiber selector taken along line 3—3 in FIG. 1.

With reference to FIGS. 2 and 3, the switch (40) has a flat plate (42) and a boss (41) formed on an upper surface of the flat plate (42), wherein the boss (41) protrudes from the slot (13) defined in the cover (11). A tube (43) is formed on a lower surface of the flat plate (42) and extends into the bore (320) defined in the hollow cylinder (32). A shaft (46) is received in the tube (43) and has a knob (48) formed at an end of the shaft. The knob (48) extends through the rod (30) and protrudes out of a bottom opening of the tube (43) to engage the hill (22). A flange (47) is formed around the shaft (46) and close to the knob (48). A first spring (45) is disposed around the shaft (46) and sandwiched between a neck (49) located in the tube (43) and the flange (47) so that the knob (48) is urged by the first spring (45) to touch the hill (22) while sliding over it.

Figure 4:
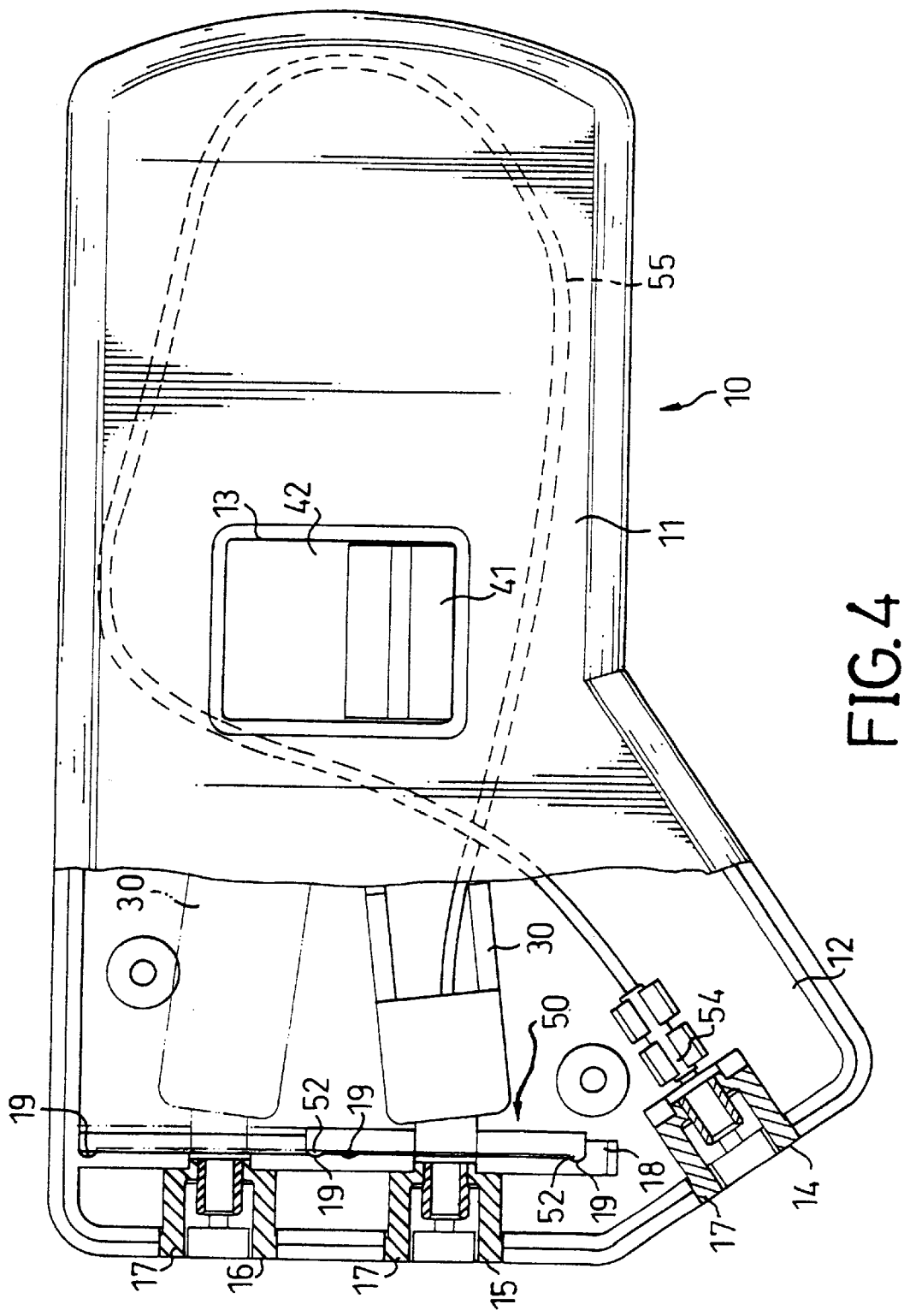
FIG. 4 is a partially cross-sectional, top view of the optical fiber selector.
Figure 5:
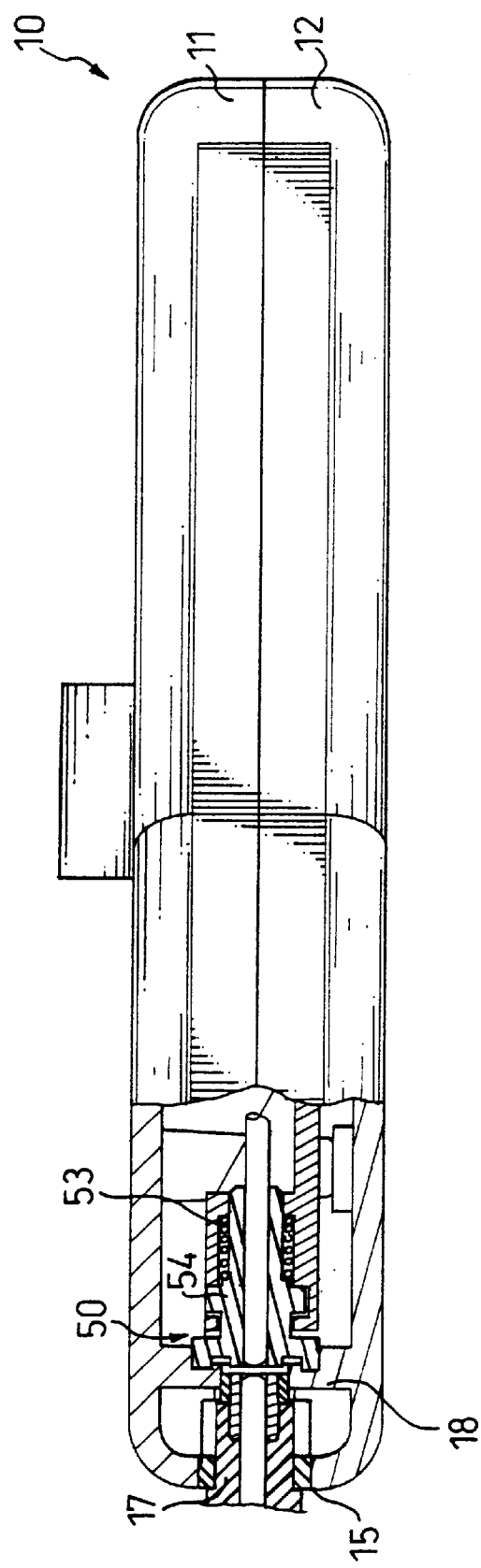
FIG. 5 is another partially cross-sectional, side view of the optical fiber selector taken along line 5—5 in FIG. 1.
Figure 6:
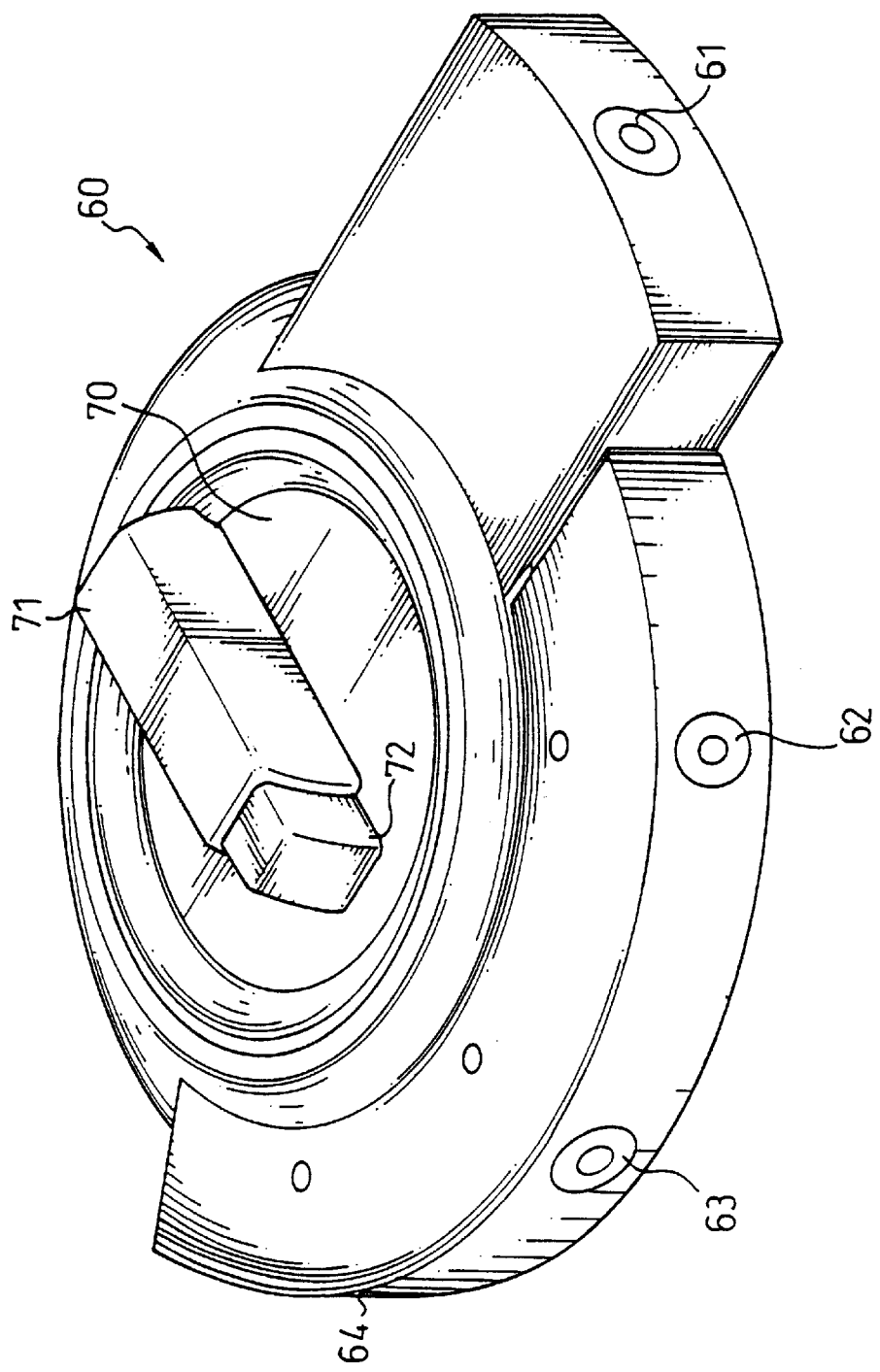
FIG. 6 is a perspective view of a conventional optical fiber selector.
Figure 7:
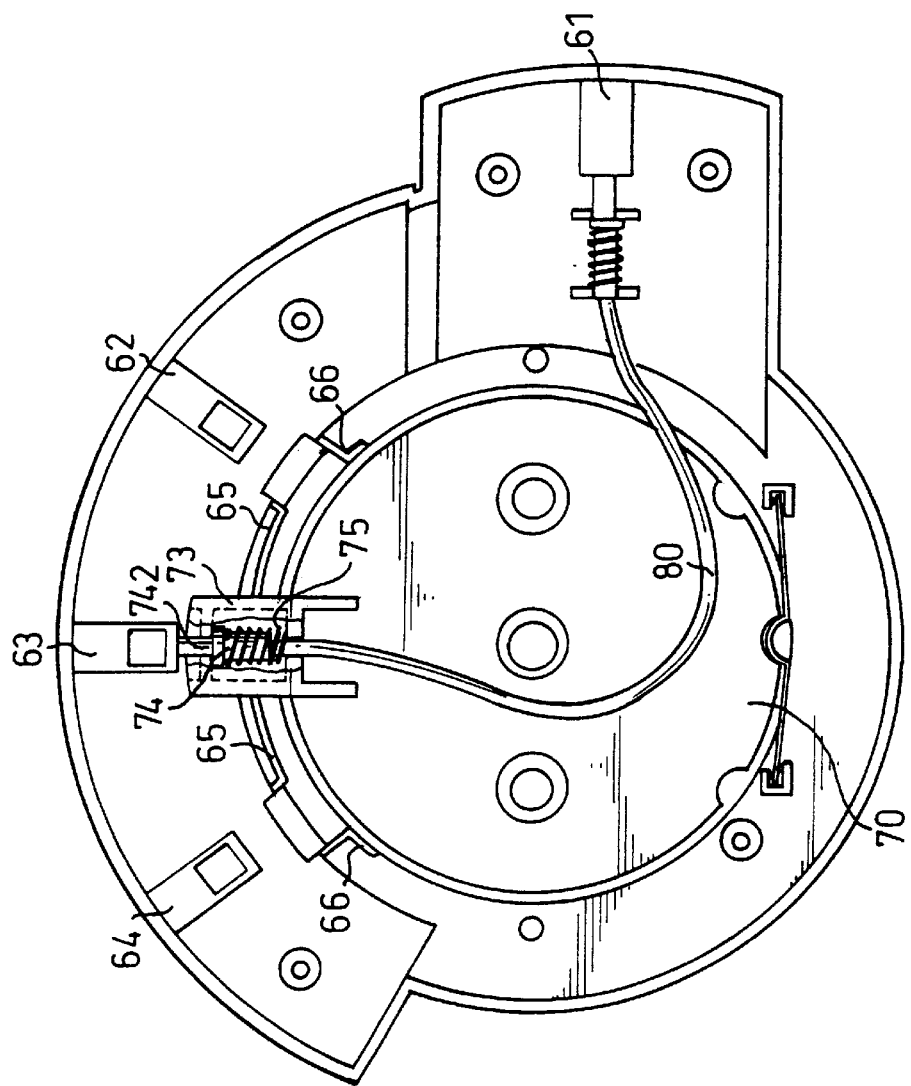
FIG. 7 is a cross-sectional view of the conventional optical fiber selector.

With reference to FIGS. 2, 4 and 5, the sliding plate (50) has a front side and a rear side, wherein the front side engages with the wall (18) of the base (12). Multiple protuberances (52) are respectively formed at corners of the sliding plate (50) to mate with the dimples (19) defined in the wall (18). A connecting head (54) is formed on the rear side of the sliding plate (50) and extends into the socket (33) defined in the rod (30). A second spring (53) is further provided around the connecting head (54) and provides a resilience urging the front side of the sliding plate (50) to engage with the wall (18) while sliding against it. An internal optical fiber (55) is disposed inside the housing (10) and connects the plug (17) of the in/out port (14) and the connecting head (54) of the sliding plate (50).

With reference to FIGS. 1 and 4, when in operation of the optical fiber selector, the plug (17) of the in/out port (14) is connected to the main optical fiber, and the plugs (17) of the connecting ports (15, 16) are respectively connected to the branch optical fibers. A user is then able to select the main optical fiber to be connected to one of the branch optical fibers by setting the switch (40) aside in the slot (13). If the switch (40) is set to a side corresponding to the connecting port (15), the rod (30) swings to a position that allows the connecting head (54) to be aligned with the plug (17) of that connecting port (15). Similarly, if the switch (40) is set to the other side corresponding to the connecting port (16), the rod (30) swings to another position that allows the connecting head (54) to be aligned with the plug (17) of that connecting port (16). It is noted that the dimples (19) are defined at the opposite sides of the connecting ports (15, 16) to mate with the protuberances (52) on the sliding plate (50), whereby the selective mating between the dimples (19) and the protuberances (52) provides a securing function to help position the connecting head (54) to align with the connecting ports (15, 16). Therefore, the user is able to select which branch optical fiber is to be connected with the main optical fiber and accordingly the optical fiber selector is able to provide a so-called selecting function.

It should be appreciated that the number of the connecting ports (15, 16) can vary in order to meet practical needs, and the description and figures only show two connecting ports (15, 16) as an exemplary illustration. A person skilled in the art can easily modify the invention to be an optical fiber selector having three or more connecting ports and these modifications should not exceed the scope of the appended claims.

From the above description, it is noted that the invention has the following advantages:

1. Single Hand Operable

The optical fiber selector can be conveniently operated using a single hand.

2. Compact Size

The internal optical fiber (55) forms a loop in the housing (10) so as to bend gradually and continuously over the entire loop. Accordingly the size of the housing (10) is relatively compact if compared with a conventional device of the like.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical fiber selector comprising:
    a housing having an in/out port mounted on a front side thereof for connecting with a main optical fiber, multiple connecting ports mounted on the front side and adjacent to the in/out port for respectively connecting with branch optical fibers, and a socket defined through a top side of the housing;
    a rod pivotally connected inside the housing and having a free end;
    a sliding plate connected to the free end of the rod, and having a connecting head;
    an internal optical fiber connecting the connecting head and the in/out port; and
    a switch connected to the rod and protruding from the slot to control pivotal movement of the rod to selectively connect the connecting head with one of the connecting ports.

2. The optical fiber selector as claimed in claim 1, wherein the housing has a wall formed therein and parallel to the front side of the housing, a front surface of the sliding plate slidingly engages the wall, multiple cutouts are defined in the wall and respectively align with the connecting ports, a socket is defined in the free end of the rod and receives the connecting head, a first spring is compressingly mounted around the connecting head to urge the front surface of sliding plate to engage with the wall while the sliding plate slides against the wall.

3. The optical fiber selector as claimed in claim 2, wherein the switch has a flat plate, a boss is formed on a top surface of the flat plate and protrudes out of the slot defined in the housing, a tube is formed on a bottom surface of the flat plate, a hollow cylinder is formed on a middle section of the rod, a bore is defined in the hollow cylinder and through the rod, the tube extends into the bore so as to connect the switch and the rod.

4. The optical fiber selector as claimed in claim 3, wherein the housing is composed of a base and a cover.

5. The optical fiber selector as claimed in claim 4, wherein the base has a hill formed on an inner surface of the base, the hill has an apex at the middle of the hill, a shaft is received in the tube and extends through the rod, a knob is formed at an end of the shaft and slidingly engages the hill, a second spring is compressingly mounted around the shaft and urges the knob to engage the hill while the knob slides over the hill.

* * * * *